United States Patent
Zhao et al.

(10) Patent No.: US 12,322,393 B1
(45) Date of Patent: Jun. 3, 2025

(54) MULTIMODAL HUMAN-MACHINE COLLABORATIVE INTERACTION SYSTEM AND METHOD

(71) Applicant: Shenzhen Jiangzhi Industrial Technology Co., LTD, Shenzhen (CN)

(72) Inventors: Guojiang Zhao, Shenzhen (CN); Guozhi Zhao, Shenzhen (CN); Suimin Zhao, Shenzhen (CN)

(73) Assignee: Shenzhen Jiangzhi Industrial Technology Co., LTD, Shenzhen (CN)

( * ) Notice: Subject to any disclaimer, the term of this patent is extended or adjusted under 35 U.S.C. 154(b) by 0 days.

(21) Appl. No.: 19/049,554

(22) Filed: Feb. 10, 2025

(30) Foreign Application Priority Data

Sep. 26, 2024 (CN) .......................... 202411348336.7

(51) Int. Cl.
*G10L 15/22* (2006.01)
*G06V 10/28* (2022.01)
(Continued)

(52) U.S. Cl.
CPC .............. *G10L 15/22* (2013.01); *G06V 10/28* (2022.01); *G06V 10/758* (2022.01); *G06V 10/761* (2022.01); *G06V 10/82* (2022.01); *G06V 20/41* (2022.01); *G06V 20/49* (2022.01); *G06V 20/52* (2022.01); *G06V 40/171* (2022.01); *G10L 13/033* (2013.01); *G10L 13/08* (2013.01); *G10L 15/1815* (2013.01); *G10L 15/1822* (2013.01); *G10L 15/183* (2013.01); *G10L 25/57* (2013.01)

(58) Field of Classification Search
CPC ....... G10L 15/22; G10L 13/033; G10L 13/08; G10L 15/1815; G10L 15/1822; G10L 15/183; G10L 25/57; G06V 10/28; G06V 10/758; G06V 10/761; G06V 10/82; G06V 20/41; G06V 20/49; G06V 20/52; G06V 40/171

See application file for complete search history.

(56) References Cited

U.S. PATENT DOCUMENTS

2023/0069720 A1* 3/2023 Beak ................. G10L 15/26
2024/0412720 A1* 12/2024 Vasylyev .......... G06F 16/90332

FOREIGN PATENT DOCUMENTS

CN         110648667 A      1/2020
CN         111625658 A      9/2020
(Continued)

*Primary Examiner* — Abul K Azad
(74) *Attorney, Agent, or Firm* — Nitin Kaushik (57) ABSTRACT

The present invention discloses a multimodal human-machine collaborative interaction system and method, and relates to the technical field of human-machine collaborative interaction. The method includes: collecting a monitoring video captured by an intelligent question-answering robot and having a moving object in a picture, and extracting a target moving object and a human voice corresponding to the target moving object; obtaining a human speech pace corresponding to the human voice, obtaining a response text corresponding to the human voice, and obtaining a key coefficient corresponding to each keyword in the response text; obtaining a response speech pace of each keyword; and adjusting a response speech pace between any two adjacent keywords according to the two adjacent keywords, and then obtaining a response voice corresponding to the response text.

5 Claims, 2 Drawing Sheets

(51) Int. Cl.
*G06V 10/74* (2022.01)
*G06V 10/75* (2022.01)
*G06V 10/82* (2022.01)
*G06V 20/40* (2022.01)
*G06V 20/52* (2022.01)
*G06V 40/16* (2022.01)
*G10L 13/033* (2013.01)
*G10L 13/08* (2013.01)
*G10L 15/18* (2013.01)
*G10L 15/183* (2013.01)
*G10L 25/57* (2013.01)

(56) References Cited

FOREIGN PATENT DOCUMENTS

| CN | 113887930 A | * | 1/2022 | ............. G06F 16/35 |
| CN | 118568232 A | | 8/2024 | |

* cited by examiner

MULTIMODAL HUMAN-MACHINE COLLABORATIVE INTERACTION SYSTEM AND METHOD

CROSS-REFERENCE TO RELATED APPLICATIONS

The application claims priority to Chinese patent application No. 202411348336.7, filed on Sep. 26, 2024, the entire contents of which are incorporated herein by reference.

TECHNICAL FIELD

The present invention relates to the technical field of human-machine collaborative interaction, and in particular, to a multimodal human-machine collaborative interaction system and method.

BACKGROUND

Multimodal technology enables collaborative interaction between humans and machines, and integrates multiple interaction methods to make communication between humans and machines more natural, efficient and intelligent. In shopping malls, there are often intelligent question-answering robots capable of helping customers find stores or specific positions. These intelligent question-answering robots are usually equipped with voice recognition and voice synthesis technology, and can communicate with customers through voice communication. Customers can achieve collaborative interaction with intelligent question-answering robots by multimodal information such as voice commands and touch screen operations. However, existing intelligent question-answering robot systems usually respond based on a preset speech pace and are unable to intelligently adjust the speech pace of each person. This means that when each person communicates with the intelligent question-answering robot, a speech pace of the robot may not match a speech pace habit of an individual, resulting in poor or uncomfortable communication. Therefore, the speech pace of the intelligent question-answering robot is adjusted based on the speech pace of each person, so that the intelligent question-answering robot can better meet a requirement of a user when responding, which helps to improve the efficiency and fluency of human-machine collaborative interaction, thereby bringing a more personalized communication experience.

SUMMARY

An objective of the present invention is to provide a multimodal human-machine collaborative interaction system and method, which are used to solve the problems in the prior art.

To achieve the above objective, the present invention provides the following technical embodiments.

A multimodal human-machine collaborative interaction method includes the following steps:
step S100: collecting a monitoring video captured by an intelligent question-answering robot and having a moving object in a picture, dividing the monitoring video into a monitoring picture and a monitoring audio, analyzing the monitoring video, and extracting a target moving object performing conversation and communication with the intelligent question-answering robot and a human voice corresponding to the target moving object from the monitoring video;

step S200: parsing a voice text corresponding to the human voice and analyzing the voice text to obtain a human speech pace corresponding to the human voice; obtaining a response text corresponding to the human voice by a pre-trained large language model, acquiring each keyword in the response text, and obtaining a key coefficient of each keyword according to a semantic relationship between each keyword and the voice text;

step S300: obtaining a feature weight corresponding to each keyword according to the key coefficient corresponding to each keyword, and obtaining a response speech pace corresponding to each keyword by taking the human speech pace corresponding to the human voice as an adjustment basis; and step S400: adjusting a response speech pace of a text between any two adjacent keywords according to a response speech pace between the two adjacent keywords and a quantity of the keywords, so as to obtain a response voice corresponding to the response text.

Further, the step S100 includes the following steps:
step S110: acquiring a real-time monitoring video S seconds ahead by taking a current moment as a starting point, dividing the real-time monitoring video into a plurality of frames of monitoring pictures, and sequencing all the monitoring pictures from back to front according to monitoring moments corresponding to the monitoring pictures by taking the current moment as the starting point; constructing a neural network model, marking all moving objects in a certain frame of monitoring picture and a rectangular area box corresponding to a mouth area of each moving object in the certain frame of monitoring picture; acquiring a grayscale value of each pixel in a certain rectangular area box, aggregating same grayscale values to obtain a proportion of each grayscale value, and then establishing a grayscale histogram corresponding to the certain rectangular area box; and according to grayscale histograms of the certain rectangular area box in an $i^{th}$ frame of monitoring picture and an $i+1^{th}$ frame pf monitoring picture, obtaining a histogram similarity GS corresponding to the two grayscale histograms, if the histogram similarity $GS>GS_0$, wherein $GS_0$ is a histogram similarity threshold, performing first marking on the $i^{th}$ frame of monitoring picture, and if the histogram similarity $GS \leq GS_0$, performing second marking on the $i^{th}$ frame of monitoring picture, wherein $1 \leq i < i+1$;

it should be noted that, when a person speaks, a mouth shape is constantly changing, resulting in different mouth shapes in different frames of monitoring pictures and different grayscale values of mouth areas in different frames of monitoring pictures; therefore, this embodiment represents a mouth shape change by using the histogram similarity corresponding to the two grayscale histograms, if the histogram similarity is smaller, it indicates that the mouth shape changes less significantly, and the person is judged not to speak, and if the histogram similarity value is larger, it indicates that the mouth shape changes more significantly, and the person is judged to speak;

step S120: acquiring all local areas of each moving object in a certain frame of monitoring picture, wherein the local areas include eyes, ears, nose and mouth of a face; if a quantity of local areas of a certain moving object is greater than a quantity threshold, and performing feature marking on the certain moving object in the certain frame of monitoring picture;

step S130: according to the sequenced monitoring pictures, if a $1^{st}$ frame of monitoring picture to an $n^{th}$ frame of monitoring picture are all subjected to first marking and an $n+1^{th}$ frame of monitoring picture is subjected to second marking, an $m^{th}$ frame of monitoring picture is subjected to second marking and an $m+1^{th}$ frame of monitoring picture to an $m+n^{th}$ frame of monitoring picture are all subjected to first marking, and certain moving objects in the $n^{th}$ frame of monitoring picture to the $m^{th}$ frame of monitoring picture are all subjected to feature marking, taking a monitoring audio corresponding to a monitoring video between the $n^{th}$ frame of monitoring picture and the $m^{th}$ frame of monitoring picture as a feature audio, wherein n and m are respectively a first picture threshold and a second picture threshold, and 1<n<m; and step S140: acquiring a total quantity of pictures subjected to second marking between the $n^{th}$ frame of monitoring picture and the $m^{th}$ frame of monitoring picture, and dividing the total quantity of pictures subjected to second marking by a total quantity of pictures between the $n^{th}$ frame of monitoring picture and the $m^{th}$ frame of monitoring picture to obtain a picture ratio $R_G$; preprocessing the feature audio, obtaining a total moment when an amplitude in the feature audio is greater than an amplitude threshold, and dividing the total moment by a total moment corresponding to the feature audio to obtain an audio ratio $R_A$; and if $|R_G-R_A| \leq R_0$, wherein $R_0$ is a ratio threshold, taking the certain moving object as a target moving object and taking the feature audio as the human voice.

The moving object in this embodiment is a human body, the preprocessing includes noise removal, signal enhancement and normalization, and the preprocessing mainly aims to improve the clarity of human voice. In this embodiment, during normal chatting and phone calls, although making sounds, people are not talking to robots, and their faces are not necessarily pointing at the intelligent question-answering robot, so this type of human body cannot be used as a target human body. This embodiment performs a comprehensive analysis of a human voice, a human mouth shape and a local area, if there is a human voice, however, the human body is not in the monitoring video, or the human body in the monitoring video but facing away from the robot, and the human body cannot be judged; in this case, it is judged that the human body is not talking to the robot. The purpose of this step is to find the target human body that is actually talking to the robot by analyzing the human mouth shape and the local area.

Further, the step S200 includes the following steps:
step S210: parsing a voice text corresponding to the human voice by using a voice recognition algorithm, acquiring a total quantity of words $N_h$ in the voice text, and obtaining a human speech pace $P_h=N_h/T_h$ corresponding to the human voice according to a speech time $T_h$ corresponding to the human voice; and step S220: preprocessing the voice text, performing relationship extraction to obtain all entities and defined relationships in the voice text, and obtaining a knowledge graph corresponding to the voice text according to the entities and the defined relationships; acquiring each keyword in the response text to obtain semantic similarity between a certain keyword a and each entity and each defined relationship in the knowledge graph, normalizing the semantic similarity, and if a certain semantic similarity is greater than a semantic similarity threshold, setting a quantity weight to be 1, and further obtaining a final quantity weight Q; obtaining a key coefficient $K_a=1-e^{-Q}$ corresponding to the certain keyword a, wherein $0 \leq Q$, e is a natural logarithm, and $0 \leq K_a < 1$; and further obtaining a key coefficient corresponding to each keyword.

The knowledge graph is a technology that represents knowledge and information in a graphical manner, and is composed of entities and defined relationships. In this embodiment, the large language model is a word vector model. The large language model refers to a type of models capable of processing natural language, and the word vector model is one of this type of models. The existing Word2Vec can calculate the semantic similarity between two words. The specific technology can be obtained by cosine similarity and the semantic similarity is normalized.

Further, the step S300 includes the following steps:
step S310: according to the key coefficient corresponding to each keyword, obtaining a feature weight corresponding to a certain keyword a as follows:

$$V_a = K_a / \sum_{h=1}^{H} K_h,$$

wherein $K_a$ is a key coefficient corresponding to the certain keyword a, H is a total quantity of the keywords, and $K_h$ is a key coefficient corresponding to a certain keyword h; and step S320: obtaining a response speech pace corresponding to the certain keyword a as $P_a=(1-K_a)*P_h/(1+V_a)$, if $P_a>P_1$, setting $P_a=P_1$, and if $P_a>P_2$, setting $P_a=P_2$, wherein $K_a$ is the key coefficient corresponding to the certain keyword a, $P_h$ is a human speech pace corresponding to the human voice, and $P_1$ and $P_2$ are a first speech pace threshold and a second speech pace threshold respectively.

According to the key coefficient corresponding to each keyword, if the key coefficient of the keyword is larger, it indicates that more effective information is covered by the keyword, and to facilitate human understanding better, the corresponding response speech pace should be slower, so that the human can know and understand the key information.

Further, the step S400 includes the following steps:
step S410: acquiring any two adjacent keywords A and B, and a response speech pace $P_A$ of the keywords A and a response speech paces of the keywords B; recording a quantity of words in the keywords A and B as $W_A$ and $W_B$, and if $1/L \leq W_A/W_B \leq L$, obtaining a response speech pace of a text between the keywords A and B as $P_B{}^A=(P_A*W_A+P_B*W_B)/(W_A+W_B)$, wherein L is a word quantity proportion threshold;

when a quantity of words in the keyword A is not much different from that in the keyword B, a median value should be taken based on the response speech pace of the keyword A and the keyword B; when the quantity of words in the keyword A is much different from that in the keyword B, to adapt to the human body, a response speech pace corresponding to a maximum value between $W_A$ and $W_B$ should be used as a response speech pace of a text between the keyword A and the keyword B, and in this embodiment, L=1.5; the adjustment of the pronunciation of the robot is essentially the adjustment of parameters of a speech synthesis engine, the parameters of the speech synthesis engine include speech pace, pitch, volume, and timbre. In this embodiment, the speech pace is a research object, which is achieved by adjusting a speech pace of keywords in a response text or a speech pace of a text between the keywords, and the speech synthesis engine may change the reading speed of the entire text by adjusting the speech pace;

step S420: if $W_A/W_B<1/L$ or $W_A/W_B>L$, taking a response speech pace corresponding to a maximum value in $W_A$ and $W_B$ as the response speech pace of the text between the keyword A and the keyword B; and then obtaining the response voice corresponding to the response text according to a response speech pace of each keyword and a response speech pace of a text between any two adjacent keywords.

The multimodal human-machine collaborative interaction system includes a target moving object judging module, a key coefficient calculating module, a response speech pace calculating module, and a response voice obtaining module; wherein the target moving object judging module is configured to collect a monitoring video captured by an intelligent question-answering robot and having a moving object in a picture, divide the monitoring video into a monitoring picture and a monitoring audio, analyze the monitoring video, and extract a target moving object performing conversation and communication with the intelligent question-answering robot and a human voice corresponding to the target moving object from the monitoring video;

the key coefficient calculating module is configured to parse a voice text corresponding to the human voice and analyze the voice text to obtain a human speech pace corresponding to the human voice; obtain a response text corresponding to the human voice by a pre-trained large language model, acquire each keyword in the response text, and obtain a key coefficient of each keyword according to a semantic relationship between each keyword and the voice text;

the response speech pace calculating module is configured to obtain a feature weight corresponding to each keyword according to the key coefficient corresponding to each keyword, and obtain a response speech pace corresponding to each keyword by taking the human speech pace corresponding to the human voice as an adjustment basis; and the response voice obtaining module is configured to adjust a response speech pace of a text between any two adjacent keywords according to a response speech pace between the two adjacent keywords and a quantity of the keywords, so as to obtain a response voice corresponding to the response text.

Further, the target moving object judging module includes a grayscale histogram establishing unit, a feature marking unit, a feature audio acquiring unit, and a target moving object obtaining unit; wherein the grayscale histogram establishing unit is configured to acquire a real-time monitoring video S seconds ahead by taking a current moment as a starting point, and divide the real-time monitoring video into a plurality of frames of monitoring pictures; mark all moving objects in a certain frame of monitoring picture and a rectangular area box corresponding to a mouth area of each moving object in the certain frame of monitoring picture, and establish a grayscale histogram corresponding to a certain rectangular area box; and obtain a histogram similarity corresponding to the grayscale histogram according to the grayscale histogram corresponding to the certain rectangular area box, and performing first marking or second marking on the monitoring picture;

the feature marking unit is configured to acquire a local area of each moving object in the certain frame of monitoring picture, and perform feature marking on a certain moving object in the certain frame of monitoring picture;

the feature audio acquiring unit is configured to extract a feature audio from the monitoring video according to the sequenced monitoring pictures; and the target moving object obtaining unit is configured to obtain a picture proportion according to the monitoring pictures, obtain an audio proportion according to the feature audio and obtain the target moving object and the human voice.

Further, the response voice obtaining module includes a text response speech pace calculating unit and a response voice obtaining unit; wherein the text response speech pace calculating unit is configured to acquire a response speech pace between any two adjacent keywords and a quantity of the keywords, and obtain a response speech pace of a text between the any two adjacent keywords; and the response voice obtaining unit is configured to obtain a response voice corresponding to a response text according to a response speech pace of each keyword and a response speech pace of a text between any two adjacent keywords.

Compared with the prior art, the present invention has the following beneficial effects: the present invention provides a multimodal human-machine collaborative interaction system and method, wherein the method includes: collecting a monitoring video captured by an intelligent question-answering robot and having a moving object in a picture, and extracting a target moving object and a human voice corresponding to the target moving object; obtaining a human speech pace corresponding to the human voice, obtaining a response text corresponding to the human voice, and obtaining a key coefficient corresponding to each keyword in the response text; obtaining a response speech pace of each keyword; and adjusting a response speech pace between any two adjacent keywords according to the two adjacent keywords, and then obtaining a response voice corresponding to the response text. According to the present invention, the human voice corresponding to the moving object is obtained by analyzing the monitoring video corresponding to the intelligent question-answering robot, and the speech pace of the robot is adjusted to meet the requirements of the user according to the human voice, so that the efficiency and the fluency of human-machine collaborative interaction are improved.

DETAILED DESCRIPTION OF THE EMBODIMENTS

The following clearly and completely describes the technical solutions in the embodiments of the present invention with reference to drawings in the embodiments of the present invention. It is clear that the described embodiments are merely a part rather than all of the embodiments of the present invention. All other embodiments obtained by those of ordinary skill in the art based on embodiments of the present invention without creative efforts shall fall within the protection scope of the present invention.

Figure 1:
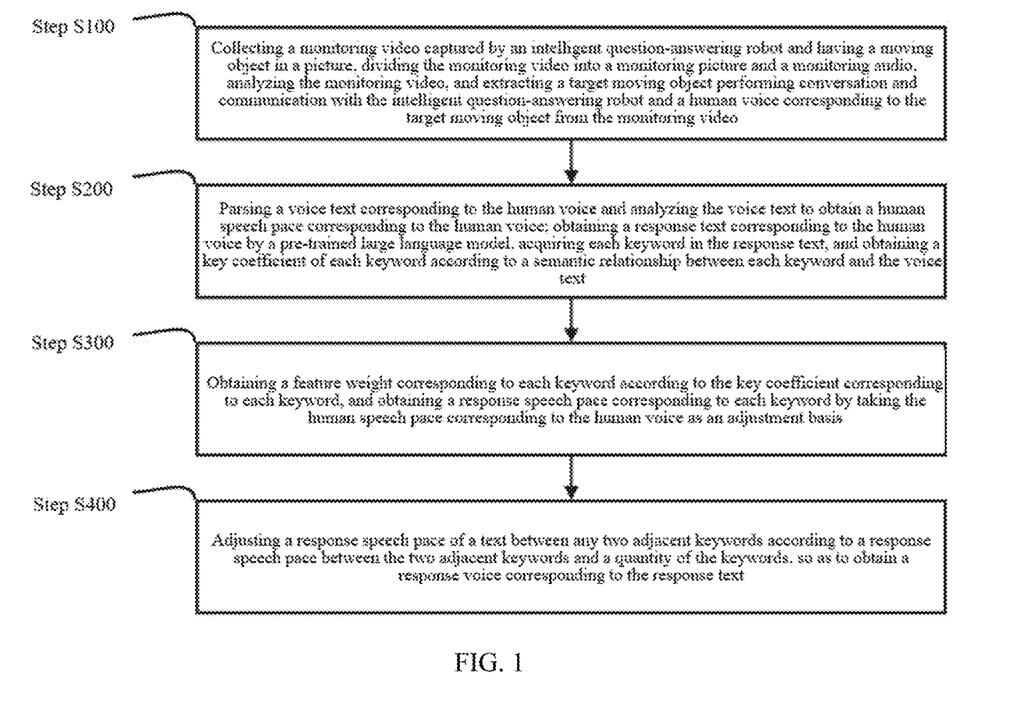
FIG. 1 is a schematic flow chart of a multimodal human-machine collaborative interaction method according to the present invention.
Figure 2:
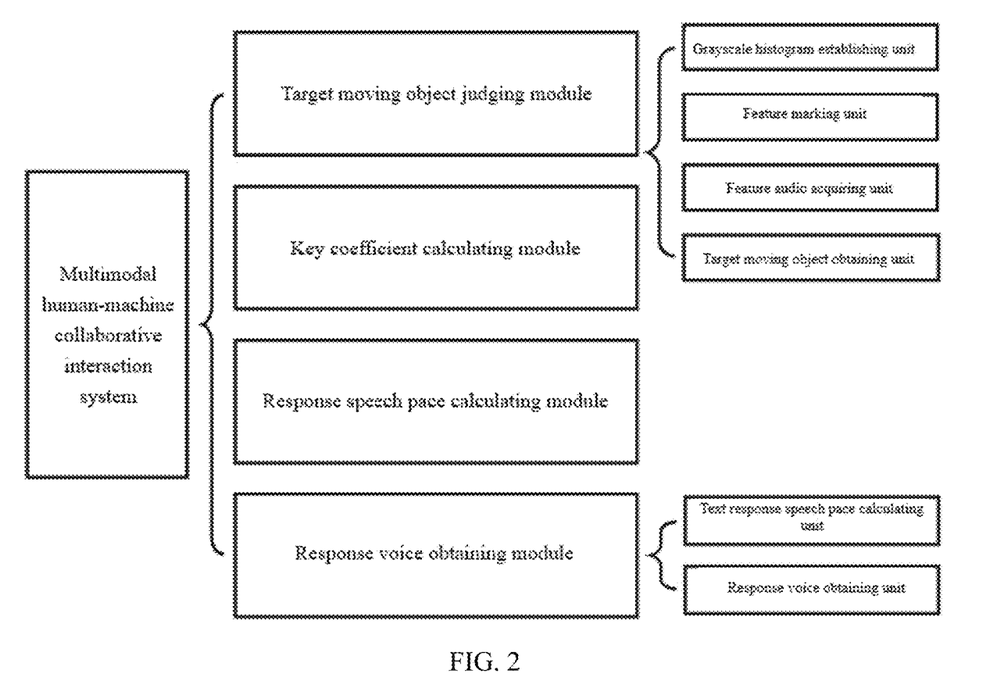
FIG. 2 is a structural diagram of a multimodal human-machine collaborative interaction system according to the present invention.

Referring to FIGS. 1 to 2, the present invention provides a multimodal human-machine collaborative interaction system and method, and a flow chart of the corresponding multimodal human-machine collaborative interaction method is shown in FIG. 1. The multimodal human-machine collaborative interaction method includes the following steps:

Step S100: collecting a monitoring video captured by an intelligent question-answering robot and having a moving object in a picture, dividing the monitoring video into a monitoring picture and a monitoring audio, analyzing the monitoring video, and extracting a target moving object performing conversation and communication with the intelligent question-answering robot and a human voice corresponding to the target moving object from the monitoring video.

Step S110: acquiring a real-time monitoring video S seconds ahead by taking a current moment as a starting point, dividing the real-time monitoring video into a plurality of frames of monitoring pictures, and sequencing all the monitoring pictures from back to front according to monitoring moments corresponding to the monitoring pictures by taking the current moment as the starting point; constructing a neural network model, marking all moving objects in a certain frame of monitoring picture and a rectangular area box corresponding to a mouth area of each moving object in the certain frame of monitoring picture; acquiring a grayscale value of each pixel in a certain rectangular area box, aggregating same grayscale values to obtain a proportion of each grayscale value, and then establishing a grayscale histogram corresponding to the certain rectangular area box; and according to grayscale histograms of the certain rectangular area box in an $i^{th}$ frame of monitoring picture and an $i+1^{th}$ frame pf monitoring picture, obtaining a histogram similarity GS corresponding to the two grayscale histograms, if the histogram similarity GS>$GS_0$, wherein $GS_0$ is a histogram similarity threshold, performing first marking on the $i^{th}$ frame of monitoring picture, and if the histogram similarity GS≤$GS_0$, performing second marking on the $i^{th}$ frame of monitoring picture, wherein $1 \leq i < i+1$.

It should be noted that, when a person speaks, a mouth shape is constantly changing, resulting in different mouth shapes in different frames of monitoring pictures and different grayscale values of mouth areas in different frames of monitoring pictures; therefore, this embodiment represents a mouth shape change by using the histogram similarity corresponding to the two grayscale histograms, if the histogram similarity is smaller, it indicates that the mouth shape changes less significantly, and the person is judged not to speak, and if the histogram similarity value is larger, it indicates that the mouth shape changes more significantly, and the person is judged to speak. S in the S seconds ahead is to limit the speaking time of the human voice. Generally, when a human asks the robot for directions, the time is not too long. In this embodiment, S=10.

Step S120: acquiring all local areas of each moving object in a certain frame of monitoring picture, wherein the local areas include eyes, ears, nose and mouth of a face; if a quantity of local areas of a certain moving object is greater than a quantity threshold, and performing feature marking on the certain moving object in the certain frame of monitoring picture.

The local areas include eyes, ears, nose and mouth of a face, a total of 6. The human should face the robot when speaking, a quantity threshold is 4 in this embodiment, when the quantity of the local areas is 5 or 6, it indicates that the human body is facing the robot, which means that there is an intention to talk to the robot; when the quantity of the local areas is less, it indicates that the human does not intend to talk to the robot.

Step S130: according to the sequenced monitoring pictures, if a $1^{st}$ frame of monitoring picture to an $n^{th}$ frame of monitoring picture are all subjected to first marking and an $n+1^{th}$ frame of monitoring picture is subjected to second marking, an $m^{th}$ frame of monitoring picture is subjected to second marking and an $m+1^{th}$ frame of monitoring picture to an $m+n^{th}$ frame of monitoring picture are all subjected to first marking, and certain moving objects in the $n^{th}$ frame of monitoring picture to the $m^{th}$ frame of monitoring picture are all subjected to feature marking, taking a monitoring audio corresponding to a monitoring video between the $n^{th}$ frame of monitoring picture and the $m^{th}$ frame of monitoring picture as a feature audio, wherein n and m are respectively a first picture threshold and a second picture threshold, and $1 < n < m$.

Step S140: acquiring a total quantity of pictures subjected to second marking between the $n^{th}$ frame of monitoring picture and the $m^{th}$ frame of monitoring picture, and dividing the total quantity of pictures subjected to second marking by a total quantity of pictures between the $n^{th}$ frame of monitoring picture and the $m^{th}$ frame of monitoring picture to obtain a picture ratio $R_G$; preprocessing the feature audio, obtaining a total moment when an amplitude in the feature audio is greater than an amplitude threshold, and dividing the total moment by a total moment corresponding to the feature audio to obtain an audio ratio $R_A$; and if $|R_G - R_A| \leq R_0$, wherein $R_0$ is a ratio threshold, taking the certain moving object as a target moving object and taking the feature audio as the human voice.

The preprocessing includes noise removal, signal enhancement and normalization, and the preprocessing mainly aims to improve the clarity of human voice. In this embodiment, during normal chatting and phone calls, although making sounds, people are not talking to robots, and their faces are not necessarily pointing at the intelligent question-answering robot, so this type of human body cannot be used as a target human body. This embodiment performs a comprehensive analysis of a human voice, a human mouth shape and a local area, if there is a human voice, however, the human body is not in the monitoring video, or the human body in the monitoring video but facing away from the robot, and the human body cannot be judged; in this case, it is judged that the human body is not talking to the robot. The purpose of this step is to find the target human body that is actually talking to the robot by analyzing the human mouth shape and the local area.

Step S200: parsing a voice text corresponding to the human voice and analyzing the voice text to obtain a human speech pace corresponding to the human voice; obtaining a response text corresponding to the human voice by a pre-trained large language model, acquiring each keyword in the response text, and obtaining a key coefficient of each keyword according to a semantic relationship between each keyword and the voice text.

Step S210: parsing a voice text corresponding to the human voice by using a voice recognition algorithm, acquiring a total quantity of words $N_h$ in the voice text, and obtaining a human speech pace $P_h = N_h/T_h$ corresponding to the human voice according to a speech time $T_h$ corresponding to the human voice.

Step S220: preprocessing the voice text, performing relationship extraction to obtain all entities and defined relationships in the voice text, and obtaining a knowledge graph corresponding to the voice text according to the entities and the defined relationships; acquiring each keyword in the response text to obtain semantic similarity between a certain keyword a and each entity and each defined relationship in the knowledge graph, normalizing the semantic similarity, and if a certain semantic similarity is greater than a semantic similarity threshold, setting a quantity weight to be 1, and further obtaining a final quantity weight Q; obtaining a key coefficient $K_a = 1 - e^{-Q}$ corresponding to the certain keyword a, wherein $0 \leq Q$, e is a natural logarithm, and $0 \leq K_a < 1$; and further obtaining a key coefficient corresponding to each keyword.

The knowledge graph is a technology that represents knowledge and information in a graphical manner, and is composed of entities and defined relationships. The entities refer to people, places, things, concepts, and the like. Each entity has a unique identifier and may contain attribute information about the entity such as name, description, and type. The defined relationships represent relationships between entities. The relationships may be of various types, such as classification relationships, attribute relationships, and semantic relationships. The defined relationships may also contain attribute information, such as the type, strength, and direction of the relationship.

In this embodiment, the large language model is a word vector model. The large language model refers to a type of models capable of processing natural language, and the word vector model is one of this type of models. The existing Word2Vec can calculate the semantic similarity between two words. The specific technology can be obtained by cosine similarity and the semantic similarity is normalized. The specific implementation process is not described herein again. Semantic similarity represents a degree of semantic proximity between two words, which reflects the similarity of the two words in terms of meaning, concept, pointed object, and the like. If the semantic similarity between two words is high, it indicates that the two words have expressed similar meanings or described similar things to a large extent. For example, in Chinese, "which floor" and "first floor" have a certain degree of semantic similarity because the two words both refer to the location of a floor and share some common attributes. The semantic similarity between "front" and "first floor" is low because the two words belong to completely different conceptual categories, one representing orientation and one representing a specific floor.

Step S300: obtaining a feature weight corresponding to each keyword according to the key coefficient corresponding to each keyword, and obtaining a response speech pace corresponding to each keyword by taking the human speech pace corresponding to the human voice as an adjustment basis.

Step S310: according to the key coefficient corresponding to each keyword, obtaining a feature weight corresponding to a certain keyword a as follows:

$$V_a = K_a / \sum_{h=1}^{H} K_h,$$

wherein $K_a$ is a key coefficient corresponding to the certain keyword a, H is a total quantity of the keywords, and $K_h$ is a key coefficient corresponding to a certain keyword h.

Step S320: obtaining a response speech pace corresponding to the certain keyword a as $P_a = (1 - K_a) * P_h/(1 + V_a)$, if $P_a < P_1$, setting $P_a = P_1$, and if $P_a > P_2$, setting $P_a = P_2$, wherein $K_a$ is the key coefficient corresponding to the certain keyword a, $P_h$ is a human speech pace corresponding to the human voice, and $P_1$ and $P_2$ are a first speech pace threshold and a second speech pace threshold respectively.

According to the key coefficient corresponding to each keyword, if the key coefficient of the keyword is larger, it indicates that more effective information is covered by the keyword, and to facilitate human understanding better, the corresponding response speech pace should be slower, so that the human can know and understand the key information.

Step S400: adjusting a response speech pace of a text between any two adjacent keywords according to a response speech pace between the two adjacent keywords and a quantity of the keywords, so as to obtain a response voice corresponding to the response text.

Step S410: acquiring any two adjacent keywords A and B, and a response speech pace $P_A$ of the keywords A and a response speech paces of the keywords B; recording a quantity of words in the keywords A and B as $W_A$ and $W_B$, and if $1/L \leq W_A/W_B \leq L$, obtaining a response speech pace of a text between the keywords A and B as $P_g = (P_A * W_A + P_B * W_B)/(W_A + W_B)$, wherein L is a word quantity proportion threshold.

When a quantity of words in the keyword A is not much different from that in the keyword B, a median value should be taken based on the response speech pace of the keyword A and the keyword B; when the quantity of words in the keyword A is much different from that in the keyword B, to adapt to the human body, a response speech pace corresponding to a maximum value between $W_A$ and $W_B$ should be used as a response speech pace of a text between the keyword A and the keyword B, and in this embodiment, $L = 1.5$. The adjustment of the pronunciation of the robot is essentially the adjustment of parameters of a speech synthesis engine, the parameters of the speech synthesis engine include speech pace, pitch, volume, and timbre. In this embodiment, the speech pace is a research object, which is achieved by adjusting a speech pace of keywords in a response text or a speech pace of a text between the keywords, and the speech synthesis engine may change the reading speed of the entire text by adjusting the speech pace.

Step S420: if $W_A/W_B < 1/L$ or $W_A/W_B > L$, taking a response speech pace corresponding to a maximum value in $W_A$ and $W_B$ as the response speech pace of the text between the keyword A and the keyword B; and then obtaining the response voice corresponding to the response text according to a response speech pace of each keyword and a response speech pace of a text between any two adjacent keywords.

It should be noted that, in the present invention, relational terms such as "first" and "second" are merely used to distinguish one entity or operation from another entity or operation without necessarily requiring or implying any actual relationship or order between such entities or operations. Moreover, terms "include", "comprise", or any other variants thereof are intended to cover a non-exclusive inclusion, so that a process, a method, an article, or a device that includes a list of elements includes those elements, and also includes other elements which are not expressly listed, or further includes elements inherent to this process, method, article, or device.

Finally, it should be noted that the above mentioned contents are only preferred embodiments of the present invention and are not intended to limit the present invention. Although the present invention has been described in detail with reference to the foregoing embodiments, for those skilled in the art, modifications may be still made to the technical solutions described in the foregoing embodiments, or equivalent substitutions may be made to some of technical features. Any modification, equivalent replacement, improvement, or the like made without departing from the spirit and principle of the present invention shall fall within the protection scope of the present invention.

What is claimed is:

1. A multimodal human-machine collaborative interaction method, comprising the following steps:

step S100: collecting a monitoring video captured by an intelligent question-answering robot and having a moving object in a picture, dividing the monitoring video into a monitoring picture and a monitoring audio, analyzing the monitoring video, and extracting a target moving object performing conversation and communication with the intelligent question-answering robot and a human voice corresponding to the target moving object from the monitoring video;

step S200: parsing a voice text corresponding to the human voice and analyzing the voice text to obtain a human speech pace corresponding to the human voice; obtaining a response text corresponding to the human voice by a pre-trained large language model, acquiring each keyword in the response text, and obtaining a key coefficient of each keyword according to a semantic relationship between each keyword and the voice text;

step S210: parsing a voice text corresponding to the human voice by using a voice recognition algorithm, acquiring a total quantity of words $N_h$ in the voice text, and obtaining a human speech pace $P_h = N_h/T_h$ corresponding to the human voice according to a speech time $T_h$ corresponding to the human voice;

step S220: preprocessing the voice text, performing relationship extraction to obtain all entities and defined relationships in the voice text, and obtaining a knowledge graph corresponding to the voice text according to the entities and the defined relationships; acquiring each keyword in the response text to obtain semantic similarity between a certain keyword a and each entity and each defined relationship in the knowledge graph, normalizing the semantic similarity, and if a certain semantic similarity is greater than a semantic similarity threshold, setting a quantity weight to be 1, and further obtaining a final quantity weight Q; obtaining a key coefficient $K_a = 1 - e^{-Q}$ corresponding to the certain keyword a, wherein $0 \leq Q$, e is a natural logarithm, and $0 \leq K_a < 1$; and further obtaining a key coefficient corresponding to each keyword;

step S300: obtaining a feature weight corresponding to each keyword according to the key coefficient corresponding to each keyword, and obtaining a response speech pace corresponding to each keyword by taking the human speech pace corresponding to the human voice as an adjustment basis;

step S310: according to the key coefficient corresponding to each keyword, obtaining a feature weight corresponding to a certain keyword a as follows:

$$V_a = K_a / \sum\nolimits_{h=1}^{H} K_h,$$

wherein $K_a$ is a key coefficient corresponding to the certain keyword a, H is a total quantity of the keywords, and $K_h$ is a key coefficient corresponding to a certain keyword h;

step S320: obtaining a response speech pace corresponding to the certain keyword a as $P_a = (1-K_a)*P_h/(1+V_a)$, if $P_a < P_1$, setting $P_a = P_1$, and if $P_a > P_2$, setting $P_a = P_2$, wherein $K_a$ is the key coefficient corresponding to the certain keyword a, $P_h$ is a human speech pace corresponding to the human voice, and $P_1$ and $P_2$ are a first speech pace threshold and a second speech pace threshold respectively;

step S400: adjusting a response speech pace of a text between any two adjacent keywords according to a response speech pace between the two adjacent keywords and a quantity of the keywords, so as to obtain a response voice corresponding to the response text;

step S410: acquiring any two adjacent keywords A and B, and a response speech pace $P_A$ of the keywords A and a response speech paces of the keywords B; recording a quantity of words in the keywords A and B as $W_A$ and $W_B$, and if $1/L \leq W_A/W_B \leq L$, obtaining a response speech pace of a text between the keywords A and B as $P_B^A = (P_A*W_A + P_B*W_B)/(W_A + W_B)$, wherein L is a word quantity proportion threshold; and step S420: if $W_A/W_B < 1/L$ or $W_A/W_B > L$, taking a response speech pace corresponding to a maximum value in $W_A$ and $W_B$ as the response speech pace of the text between the keyword A and the keyword B; and then obtaining the response voice corresponding to the response text according to a response speech pace of each keyword and a response speech pace of a text between any two adjacent keywords.

2. The multimodal human-machine collaborative interaction method according to claim 1, wherein the step S100 comprises the following steps:

step S110: acquiring a real-time monitoring video S seconds ahead by taking a current moment as a starting point, dividing the real-time monitoring video into a plurality of frames of monitoring pictures, and sequencing all the monitoring pictures from back to front according to monitoring moments corresponding to the monitoring pictures by taking the current moment as the starting point; constructing a neural network model, marking all moving objects in a certain frame of monitoring picture and a rectangular area box corresponding to a mouth area of each moving object in the certain frame of monitoring picture; acquiring a grayscale value of each pixel in a certain rectangular area box, aggregating same grayscale values to obtain a proportion of each grayscale value, and then establishing a grayscale histogram corresponding to the certain rectangular area box; and according to grayscale histograms of the certain rectangular area box in an $i^{th}$ frame of monitoring picture and an $i+1^{th}$ frame pf monitoring picture, obtaining a histogram similarity GS corresponding to the two grayscale histograms, if the histogram similarity $GS > GS_0$, wherein $GS_0$ is a histogram similarity threshold, performing first marking on the $i^{th}$ frame of monitoring picture, and if the histogram similarity $GS \leq GS_0$, performing second marking on the $i^{th}$ frame of monitoring picture, wherein $1 \leq i < i+1$;

step S120: acquiring all local areas of each moving object in a certain frame of monitoring picture, wherein the local areas comprise eyes, ears, nose and mouth of a face; if a quantity of local areas of a certain moving object is greater than a quantity threshold, and performing feature marking on the certain moving object in the certain frame of monitoring picture;

step S130: according to the sequenced monitoring pictures, if a $1^{st}$ frame of monitoring picture to an $n^{th}$ frame of monitoring picture are all subjected to first marking and an $n+1^{th}$ frame of monitoring picture is subjected to second marking, an $m^{th}$ frame of monitoring picture is subjected to second marking and an $m+1^{th}$ frame of monitoring picture to an $m+n^{th}$ frame of monitoring picture are all subjected to first marking, and certain moving objects in the $n^{th}$ frame of monitoring picture to the $m^{th}$ frame of monitoring picture are all subjected to feature marking, taking a monitoring audio corresponding to a monitoring video between the $n^{th}$ frame of monitoring picture and the $m^{th}$ frame of monitoring picture as a feature audio, wherein n and m are respectively a first picture threshold and a second picture threshold, and 1<n<m; and step S140: acquiring a total quantity of pictures subjected to second marking between the $n^{th}$ frame of monitoring picture and the $m^{th}$ frame of monitoring picture, and dividing the total quantity of pictures subjected to second marking by a total quantity of pictures between the $n^{th}$ frame of monitoring picture and the $m^{th}$ frame of monitoring picture to obtain a picture ratio $R_G$; pre-processing the feature audio, obtaining a total moment when an amplitude in the feature audio is greater than an amplitude threshold, and dividing the total moment by a total moment corresponding to the feature audio to obtain an audio ratio $R_A$; and if $|R_G - R_A| \leq R_0$, wherein $R_0$ is a ratio threshold, taking the certain moving object as a target moving object and taking the feature audio as the human voice.

3. A multimodal human-machine collaborative interaction system configured to execute the multimodal human-machine collaborative interaction method according to claim 1, wherein the system comprises a target moving object judging module, a key coefficient calculating module, a response speech pace calculating module, and a response voice obtaining module;

the target moving object judging module is configured to collect a monitoring video captured by an intelligent question-answering robot and having a moving object in a picture, divide the monitoring video into a monitoring picture and a monitoring audio, analyze the monitoring video, and extract a target moving object performing conversation and communication with the intelligent question-answering robot and a human voice corresponding to the target moving object from the monitoring video;

the key coefficient calculating module is configured to parse a voice text corresponding to the human voice and analyze the voice text to obtain a human speech pace corresponding to the human voice; obtain a response text corresponding to the human voice by a pre-trained large language model, acquire each keyword in the response text, and obtain a key coefficient of each keyword according to a semantic relationship between each keyword and the voice text;

the response speech pace calculating module is configured to obtain a feature weight corresponding to each keyword according to the key coefficient corresponding to each keyword, and obtain a response speech pace corresponding to each keyword by taking the human speech pace corresponding to the human voice as an adjustment basis; and the response voice obtaining module is configured to adjust a response speech pace of a text between any two adjacent keywords according to a response speech pace between the two adjacent keywords and a quantity of the keywords, so as to obtain a response voice corresponding to the response text.

4. The multimodal human-machine collaborative interaction system according to claim 3, wherein the target moving object judging module comprises a grayscale histogram establishing unit, a feature marking unit, a feature audio acquiring unit, and a target moving object obtaining unit;

the grayscale histogram establishing unit is configured to acquire a real-time monitoring video S seconds ahead by taking a current moment as a starting point, and divide the real-time monitoring video into a plurality of frames of monitoring pictures; mark all moving objects in a certain frame of monitoring picture and a rectangular area box corresponding to a mouth area of each moving object in the certain frame of monitoring picture, and establish a grayscale histogram corresponding to a certain rectangular area box; and obtain a histogram similarity corresponding to the grayscale histogram according to the grayscale histogram corresponding to the certain rectangular area box, and performing first marking or second marking on the monitoring picture;

the feature marking unit is configured to acquire all local areas of each moving object in a certain frame of monitoring picture, and perform feature marking on the certain moving object in the certain frame of monitoring picture;

the feature audio acquiring unit is configured to extract a feature audio from the monitoring video according to the sequenced monitoring pictures; and the target moving object obtaining unit is configured to obtain a picture proportion according to the monitoring pictures, obtain an audio proportion according to the feature audio and obtain the target moving object and the human voice.

5. The multimodal human-machine collaborative interaction system according to claim 3, wherein the response voice obtaining module comprises a text response speech pace calculating unit and a response voice obtaining unit;

the text response speech pace calculating unit is configured to acquire a response speech pace between any two adjacent keywords and a quantity of the keywords, and obtain a response speech pace of a text between the any two adjacent keywords; and the response voice obtaining unit is configured to obtain a response voice corresponding to a response text according to a response speech pace of each keyword and a response speech pace of a text between any two adjacent keywords.

* * * * *